United States Patent [19]

Fischer et al.

[11] Patent Number: 5,328,300
[45] Date of Patent: Jul. 12, 1994

[54] ANCHORING MEANS FOR ANCHORING BY MEANS OF A BONDING MASS IN A DRILLED HOLE IN A CONCRETE PART

[75] Inventors: Artur Fischer, Tumlingen/Waldachtal; Wilfried Weber, Schopfloch/Unteriflingen, both of Fed. Rep. of Germany

[73] Assignee: fischerwerke, Artur Fischer GmbH & Co. KG, Waldachtal, Fed. Rep. of Germany

[21] Appl. No.: 108,634

[22] PCT Filed: May 5, 1993

[86] PCT No.: PCT/EP93/01095
§ 371 Date: Aug. 25, 1993
§ 102(e) Date: Aug. 25, 1993

[30] Foreign Application Priority Data

May 18, 1992 [DE]  Fed. Rep. of Germany ....... 4216214
Jul. 3, 1992 [DE]  Fed. Rep. of Germany ....... 4221853

[51] Int. Cl.⁵ .............................................. E21D 20/02
[52] U.S. Cl. .................... 405/259.6; 52/704; 405/259.5; 411/82
[58] Field of Search ................. 405/259.5, 259.6; 52/698, 704; 411/15, 82, 57, 73

[56] References Cited

U.S. PATENT DOCUMENTS

| | | | |
|---|---|---|---|
| 4,280,391 | 7/1981 | Fischer et al. | 405/256.6 X |
| 4,656,806 | 4/1987 | Leibhard et al. | 52/704 |
| 4,840,524 | 6/1989 | Bisping et al. | 411/82 |
| 5,033,910 | 7/1991 | Wright | 405/259.6 |
| 5,098,227 | 3/1992 | Wright | 405/259.5 X |
| 5,104,266 | 4/1992 | Daryobsh et al. | 405/259.6 X |

FOREIGN PATENT DOCUMENTS

| | | |
|---|---|---|
| 0186991 | 7/1986 | European Pat. Off. . |
| 0251887 | 1/1988 | European Pat. Off. . |
| 3516866 | 11/1986 | Fed. Rep. of Germany . |
| 3733854 | 4/1989 | Fed. Rep. of Germany . |

*Primary Examiner*—Dennis L. Taylor
*Attorney, Agent, or Firm*—Michael J. Striker

[57] ABSTRACT

An anchoring means for anchoring by a bonding mass in a drilled hole in a concrete part or the like has a threaded bolt with a reduced portion and an expansion cone followed by a head part, forming at the same time a stop shoulder. Over the reduced portion and expansion cone is slipped an anchoring sleeve which is provided on its outer surface with a plurality of longitudinal grooves. By the longitudinal grooves and the elasticity of the anchoring sleeve consisting of plastics material, the possibility is obtained of compensating for the enlargement of the drilled hole when a crack forms, thus making it possible for the anchoring means to be used in the zone subject to tensile forces.

11 Claims, 2 Drawing Sheets

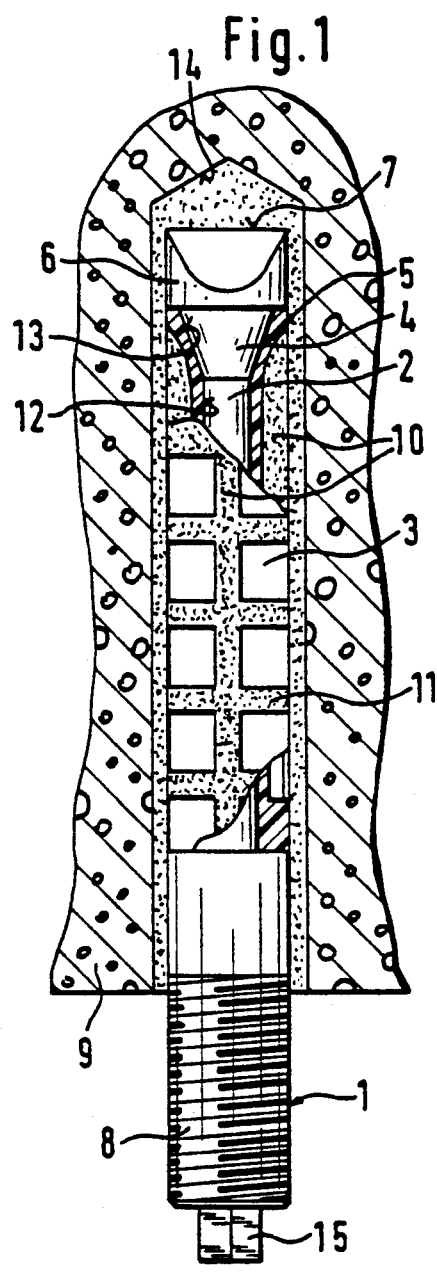
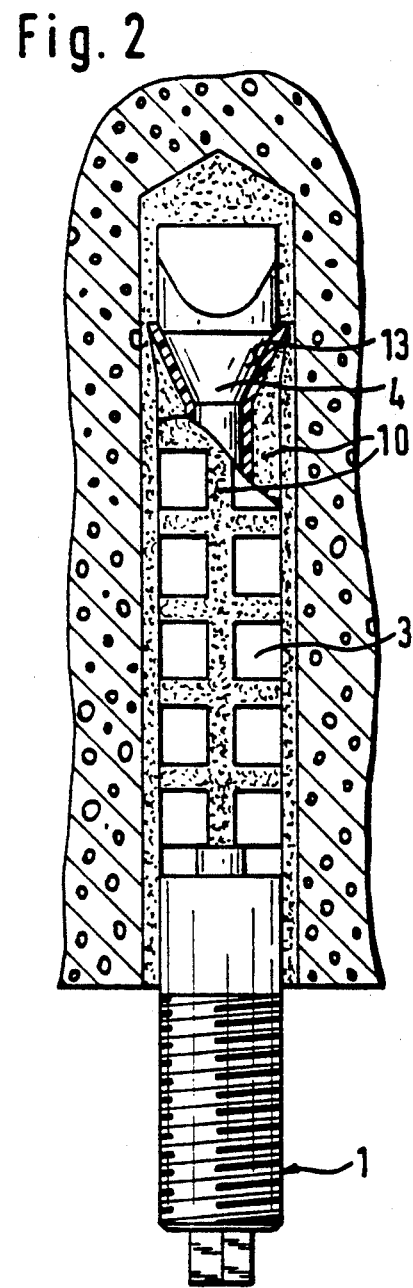
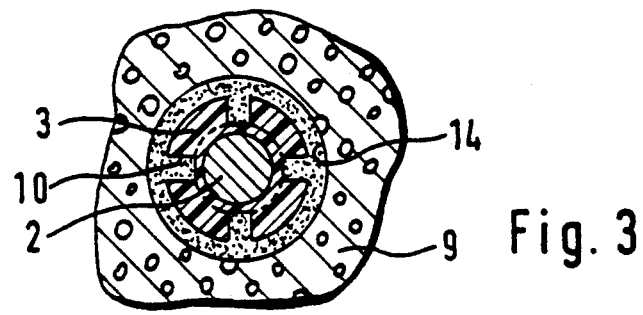

ANCHORING MEANS FOR ANCHORING BY MEANS OF A BONDING MASS IN A DRILLED HOLE IN A CONCRETE PART

BACKGROUND OF THE INVENTION

The present invention relates to an anchoring means for anchoring by a bonding mass in a drilled hole in a concrete part.

More particularly, it relates to an anchoring means which each have a threaded bolt with an expansion cone surrounded by an anchoring sleeve which can be expanded by the expansion cone.

It is known, for anchoring a threaded rod by means of a bonding mass, to form a drilled hole which has an undercut in the region of the bottom of the drilled hole. Such an anchorage is described in DE-A-13 516 866. The fixing of this known anchoring means is effected in that there is pushed into the drilled hole a glass ampoule which contains a bonding mass of polyester resin, a hardener and additives. On insertion of the anchoring means into the drilled hole, the glass ampoule is destroyed and the components of the bonding mass are activated by mixing. After the bonding mass has hardened, the anchoring means is rigidly bonded and anchored in the drilled hole. The anchorage depends essentially on the adhesive bond between the bonding mass and the wall of the drilled hole. This bond, however, is reduced considerably if a crack runs through the anchorage point. Through the enlargement of the drilled hole as a result of the crack, the bonding mass becomes detached from the wall of the drilled hole so that in the straight shaft part of the anchoring means, only limited retaining forces still obtain. The known anchoring means has, however, a conical widening in the region of the undercut of the drilled hole, so that greater retaining forces still obtain there. These depend on the form of the undercut and on the proportion of the undercut region to the total length of the hole.

The production of an undercut drilled hole requires special tools and generally also a greater expenditure during the production of the drilled hole. For this reason, experiments have already been undertaken to reduce the sensitivity to cracks by means of special configurations of the bonded anchoring means in cylindrical drilled holes. Thus, for example, it was proposed to provide the threaded bolt of the anchoring means with a cone which, by means of a coating, is capable of sliding with respect to the hardened bonding agent core. The result which is intended to be achieved thereby is that the threaded bolt settles in the bonding agent core to compensate for the widening of the crack. Such settlement can of course only be achieved if the entire threaded bolt detaches itself with respect to the hardened bonding agent core. This of course results in a considerable reduction in the holding value. Moreover, the bonding agent core is not very stable under pressure, so that even with relatively limited forces, pulling of the threaded bolt through the bonding agent core occurs.

The problem on which the invention is based is that of providing an anchoring means for anchoring by means of a bonding mass in a cylindrical drilled hole in a concrete part, which has high safety reserves in the case of anchoring in the zone subject to tensile forces, and the widening of the drilled hole which arises as a result of the formation of cracks.

SUMMARY OF THE INVENTION

Accordingly, it is an object of the present invention to provide an anchoring means which solves the above-specified problem.

In keeping with these objects and with others which will become apparent hereinafter, one feature of the present invention resides, briefly stated, in an anchoring means for anchoring in a drilled hole in a concrete part, in accordance with which a head part with a wedge-like point follows the expansion cone and forms at the same time a stop shoulder, the threaded bolt starting form the smallest diameter of the expansion cone has a portion of reduced diameter extending over part of the length of the threaded bolt and on this portion an anchoring sleeve is arranged and extends from the stop shoulder of the head part to the end of the portion and consists of plastic material with an outer surface provided with longitudinal grooves.

The thusly designed anchoring means consists of a threaded bolt with a reduced portion, over which there is slipped an expansible anchoring sleeve made of plastics material. In the direction of the bottom of the drilled hole the cylindrical portion is followed by an expansion cone, which widens out towards the bottom of the drilled hole. Onto this expansion cone there is placed, forming at the same time a stop shoulder, a head part, the outside diameter of which corresponds to the diameter of the threaded bolt. The anchoring sleeve fits on this stop shoulder and thus forms a seal which prevents the penetration of bonding agent into the internal bore of the anchoring sleeve. For anchoring, the anchoring means is driven into a drilled hole in which there is a glass ampoule filled with the components of the bonding agent. The anchoring means is introduced by means of a drill in the rotary mode, with which by rotation of the threaded bolt and simultaneous advance movement the glass ampoule is destroyed by means of the wedge-like point arranged on the head part, and the components of the bonding agent are mixed. By means of the bonding agent rising up from the bottom of the drilled hole, the drilled hole and the longitudinal grooves of the anchoring sleeve are completely filled with bonding agent.

After the bonding mass has hardened, the anchoring sleeve, and thus the threaded bolt abutting the front end of the sleeve with the stop shoulder of the head part, is firmly anchored in the drilled hole. If widening of the drilled hole now occurs because of the formation of cracks, the bonding mass detaches itself from the outer surface of the anchoring sleeve consisting of plastics material. Through the elasticity and resilience of the plastics sleeve, the threaded bolt is shifted axially relative to the sleeve by means of the tensile force engaging with it. The expansion cone on the threaded bolt is thereby retracted into the anchoring sleeve, so that both widening and upsetting of the plastics sleeve occur. Both effects lead to compensation for the widening of the drilled hole, so that the original holding force of the anchoring means before the occurrence of the crack is maintained. By means of the bonding mass hardened in the longitudinal grooves of the anchoring sleeve, the result achieved in the region of the anchoring sleeve is a bore with a tooth-like profile, the core diameter of which is smaller than the outside diameter of the head part. Thus, by way of the bonding mass, an additional interlocking is produced which assists the supporting of the threaded bolt by means of the anchoring sleeve.

Because of the narrowing of the drilled hole in the region of the reduced portion, and the possibility of compensating for the widening of the drilled hole based on the anchoring sleeve consisting of plastics material, the anchoring means according to the invention proves suitable for installation in the zone subject to tensile forces of a concrete part.

To improve the meshing of the anchoring sleeve with the hardened bonding mass, it is expedient for the outer surface of the anchoring sleeve to be provided, in addition, With circumferential grooves. Thus an interconnection is produced between longitudinal and transverse grooves, which support one another. Owing to the fact that the longitudinal grooves terminate at a distance from the front end face of the anchoring sleeve corresponding to the course of the inner cone of the anchoring sleeve, the hardened bonding mass in this region assumes a cone-like outline which intensifies the wedging effect of the anchoring sleeve by drawing in the threaded bolt.

As a result of the outside diameter of the anchoring sleeve being matched to the threaded bolt, an anchoring means having the same outside diameter throughout is produced. For fitting the anchoring means, therefore, a drilled hole in the concrete part is possible which is only slightly larger than the nominal dimension of the threaded bolt. The depth of the grooves in the anchoring sleeve is selected so that a web of approximately 0.3 to 0.5 mm remains as the groove base. An optimum narrowing of the bore in the region of the anchoring sleeve is thus achieved.

In a further embodiment of the invention, the diameter of the head part can be somewhat larger than the diameter of the anchoring sleeve and at the same time the cylindrical portion of the head part can be provided with two surfaces which preferably extend parallel to the surfaces of the wedge-like point. With this configuration, the expansion capacity of the head part, and thus the pull-through resistance for the threaded bolt, is considerably increased. Thus, even with larger crack widths and the widening of the drilled hole linked thereto, sufficiently high holding values can be achieved. The diameter of the head part is adaptable to the diameter of the drilled hole to within approximately 0.3 mm. In order to make possible or to facilitate the rising of the bonding mass from the bottom of the drilled hole along the anchoring means during the installation operation, the two surfaces preferably extending parallel to the surfaces of the wedge-like point are provided on the cylindrical portion of the head part. By way of the oblique surfaces of the wedge-like point, the bonding mass is pressed through the two gaps which are formed by means of the surfaces on the cylindrical portion of the head part and the wall of the drilled hole. The continuation of the oblique surfaces of the wedge-like point through the surfaces on the cylindrical portion, in conjunction also with the rotational movement of the anchoring means during installation, improves the mixing of the components of the bonding mass and thus the hardening process.

In order to keep the through-flow resistance as low as possible, and at the same time to obtain a maximum degree of expansion capacity for the anchoring sleeve by means of the head part, it has proved expedient for the key dimension of the two surfaces at the cylindrical portion of the head part to be matched approximately to the maximum diameter of the expansion cone.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows an anchoring means partly in longitudinal section,

FIG. 2 shows the anchoring means after widening of the drilled hole due to a crack forming, FIG. 3 shows a cross-section through the anchoring means according to FIG. 1.

DESCRIPTION OF THE PREFERRED EMBODIMENTS

Figure 4:
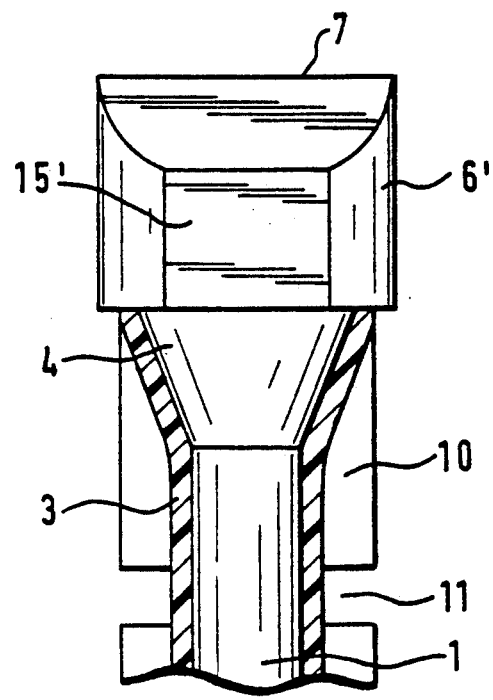
FIG. 4 shows the head part of a further exemplary embodiment of the anchoring means.

The anchoring means consists of a threaded bolt 1 with a reduced portion 2, over which a sleeve 3 of preferably glass fiber reinforced plastics material is slipped. The portion 2 with reduced diameter is followed by an expansion cone 4 on which there is in turn placed, forming at the same time a stop shoulder 5, a head part 6 of the threaded bolt. The head part 6 is provided with a wedge-like point 7 for destroying the mortar cartridge. The threaded bolt 1 has a threaded portion 8 onto which there can be screwed a nut for fastening an object to the surface of the concrete part 9.

The anchoring sleeve 3 has, on its outer surface, longitudinal grooves 10 and, at longer intervals, circumferential grooves 11. In the region of the expansion cone 4, the internal bore 12 of the anchoring sleeve is provided with an inner cone 13 which fits closely on the expansion cone 4. At the same time, the anchoring sleeve 3 sits on the stop shoulder 5, so that the internal bore of the anchoring sleeve is sealed. The longitudinal grooves 10 terminate at a distance from this stop shoulder 5 corresponding to the cone angle of the expansion cone 4.

To anchor the anchoring means, there is produced in the concrete part 9 a drilled hole 14 into which there is inserted, for example by means of a glass ampoule, a polyester resin with hardener and additives. For driving in and rotating the threaded bolt 1 there is a polygonal portion 15, onto which can be placed the driving tool clamped into a drill. When the threaded bolt is driven in, the glass ampoule is destroyed and at the same time the resin is mixed with the hardener and the additives. By means of the longitudinal grooves, after the hardening of the bonding mass a narrowing of the drilled hole is produced which in the region of the reduced portion 2 in conjunction with the anchoring sleeve 3 effects an interlocking anchorage of the threaded bolt 1. This tooth-like narrowing of the drilled hole 14 can be seen particularly clearly in FIG. 3. The threaded bolt 1 is secured in the anchoring sleeve 3 by the head part 6 sitting with its stop shoulder 5 on the end face of the anchoring sleeve 3. When a crack occurs, with the resulting widening of the drilled hole, supporting of the anchoring sleeve 3 by means of the hardened bonding mass yields somewhat. The threaded bolt 1 is thereby shifted axially by means of the tensile force acting on it, so that the expansion cone 4 retracts into the inner cone 13 of the anchoring sleeve 3. The anchoring sleeve 3 consisting of plastics material thereby widens out and in turn intensifies the expanding pressure on the wall of the drilled hole, and especially on the conical internal outline of the bonding mass produced by the termination of the longitudinal grooves 10. At the same time there occurs a slight upsetting of the anchoring sleeve 3, which in the remaining region of the anchoring sleeve compensates for the widening of the drilled hole. The anchoring sleeve 3 thus remains firmly and immovably embedded in the hardened bonding mass, so that the full holding force of the threaded bolt 1 and thus of the anchoring means is maintained.

The anchoring sleeve 3 can be applied to the reduced portion 2 by being injection-moulded round it, the threaded bolt acting as a core for the moulding round with plastics material by injection. If the anchoring sleeve is produced as a separate part, it is expedient for the threaded bolt to be made in two parts and for the reduced portion 2 to be screwed on or connected in some other way to the rear part of the threaded bolt after the anchoring sleeve 3 has been slipped on.

Figure 5:
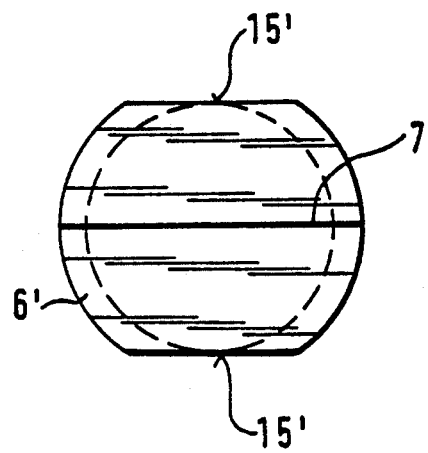
FIG. 5 shows the end face of the anchoring means according to FIG. 4.

The head part 6', shown in FIGS. 4 and 5, of the threaded bolt 1 has a diameter which is somewhat larger than the diameter of the anchoring sleeve 3. For a bonded anchoring means with a threaded bolt M12 and an anchoring sleeve diameter of 12 mm, a drilled hole diameter of 14 mm is required in the concrete part that is to be anchored. In the case of a bonded anchoring means of this diameter, the diameter of the head part can be approximately 13.7 mm. To form an adequate gap for the bonding mass, the cylindrical portion of the head part 6' is provided with two surfaces 15 which extend parallel to the oblique surfaces of the wedge-like point 7. The key dimension of the two surfaces 15 corresponds approximately to the maximum diameter of the expansion cone 4. In the case of a bonded anchoring means with the diameter ratios given above, a key dimension of approximately 12.0 to 12.5 mm is recommended.

It will be understood that each of the elements described above, or two or more together, may also find a useful application in other types of constructions differing from the type described above.

While the invention has been illustrated and described as embodied in anchoring means for anchoring by means of a bonding mass in a drilled hole in a concrete part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An anchoring device for anchoring by a bonding mass in a drilled hole in a concrete part or the like, the anchoring device comprising a threaded bolt having an end facing a drilled hole and being provided with an expansion cone widening out to said end; an anchoring sleeve surrounding said threaded bolt and expandable by said expansion cone; a head part provided with a wedge-like point and following said expansion cone so as to form at the same time a stop shoulder, said threaded bolt starting from a smallest diameter of said expansion cone having a portion of reduced diameter which extends over a part of a length of said threaded bolt, said anchoring sleeve being arranged on said portion and extending from said stop shoulder of said head part to an end of said portion and is composed of plastic material, said anchoring sleeve having also an outer surface which is provided with longitudinal grooves.

2. An anchoring device as defined in claim 1, wherein said outer surface of said anchoring sleeve is additionally provided with circumferential grooves.

3. An anchoring device as defined in claim 1, wherein said anchoring sleeve has an internal bore which corresponds to the reduced diameter of said portion.

4. An anchoring device as defined in claim 3, wherein said anchoring sleeve has in the region of said expansion cone an inner cone matched to said expansion cone.

5. An anchoring device as defined in claim 1, wherein said anchoring sleeve has a front face and said inner cone of said anchoring sleeve has a predetermined course, said longitudinal grooves terminating at a distance from said front end face of said anchoring sleeve corresponding to said course of said inner cone of said anchoring sleeve.

6. An anchoring device as defined in claim 1, wherein said threaded bolt has a predetermined outside diameter, said anchoring sleeve having an outside diameter substantially corresponding to said outside diameter of said threaded bolt.

7. An anchoring device as defined in claim 1, wherein said anchoring sleeve has a predetermined wall thickness, said grooves having a groove depth which is substantially 0.3–0.5 mm less than said wall thickness of said anchoring sleeve.

8. An anchoring device as defined in claim 1, wherein said anchoring sleeve has a predetermied diameter, said head part having a diameter which is somewhat larger than said diameter of said anchoring sleeve.

9. An anchoring device as defined in claim 8, wherein said wedge-like point has oblique surfaces, said head part has a cylindrical portion provided with two surfaces.

10. An anchoring device as defined in claim 9, wherein said two surfaces of said cylindrical portion of said head part extend parallel to said oblique surface of said wedge-like point.

11. An anchoring device as defined in claim 9, wherein said expansion cone has a maximum diameter, said two surfaces having a key dimension substantially corresponding to said maximum diameter of said expansion cone.

* * * * *